United States Patent [19]

Smutny

[11] Patent Number: 4,954,570
[45] Date of Patent: *Sep. 4, 1990

[54] POLYKETONE POLYMER BLEND

[75] Inventor: Edgar J. Smutny, Houston, Tex.

[73] Assignee: Shell Oil Company, Houston, Tex.

[*] Notice: The portion of the term of this patent subsequent to Oct. 17, 2006 has been disclaimed.

[21] Appl. No.: 198,546

[22] Filed: May 24, 1988

[51] Int. Cl.$^5$ ............................................. C08L 71/00
[52] U.S. Cl. ..................................... 525/185; 525/190
[58] Field of Search ................................. 525/185, 190

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 3,780,140 | 12/1973 | Hammer et al. | 260/884 |
| 4,123,585 | 10/1978 | Sparzak et al. | 428/379 |
| 4,137,382 | 1/1979 | Vetter, Jr. | 525/185 |
| 4,157,428 | 6/1979 | Hammer | 521/134 |
| 4,275,181 | 6/1981 | Hoh | 525/189 |
| 4,480,054 | 10/1984 | Enderle | 525/190 |
| 4,489,193 | 12/1984 | Goswami | 525/190 |
| 4,600,614 | 7/1986 | Lancaster et al. | 428/35 |
| 4,601,948 | 7/1986 | Lancaster et al. | 428/349 |

FOREIGN PATENT DOCUMENTS

| | | |
|---|---|---|
| 121965 | 10/1984 | European Pat. Off. . |
| 181014 | 5/1986 | European Pat. Off. . |
| 229408 | 7/1987 | European Pat. Off. . |
| 9174622 | 3/1983 | Japan . |
| 8607010 | 12/1986 | PCT Int'l Appl. . |
| 1081304 | 8/1967 | United Kingdom . |

*Primary Examiner*—John C. Bleutge
*Assistant Examiner*—Susan Berman

[57] ABSTRACT

The invention is a polymeric composition comprising a blend of (a) a linear alternating polymer of carbon monoxide and at least one ethylenically unsaturated hydrocarbon and (b) a propylene-α,β-ethylenically unsaturated acid copolymer or a propylene-ethylene-α,β-ethylenically unsaturated acid terpolymer.

14 Claims, No Drawings

POLYKETONE POLYMER BLEND

FIELD OF THE INVENTION

This invention relates to improved polymer blends comprising a major proportion of a linear alternating polymer of carbon monoxide and at least one ethylenically unsaturated hydrocarbon. More particularly, the invention relates to blends of the linear alternating carbon monoxide polymer with propylene-unsaturated carboxylic acid copolymer and with propylene-ethylene-unsaturated carboxylic acid terpolymer.

BACKGROUND OF THE INVENTION

The class of polymers of carbon monoxide and olefin(s) has been known for a number of years. Brubaker, U.S. Pat. No. 2,495,286 produced such polymers in the presence of free radical catalysts, e.g. peroxy compounds. U.K. No. 1,081,304 produced similar polymers of higher carbon monoxide content in the presence of alkylphosphine complexes of palladium salts as catalyst. Nozaki extended this process through the use of arylphosphine complexes of palladium and certain inert solvents, for example, U.S. Pat. No. 3,694,412.

More recently, the class of linear alternating polymers of carbon monoxide and at least one ethylenically unsaturated hydrocarbon, e.g., ethylene or ethylene and propylene, has become of greater interest in part because of the greater availability of these polymers. The polymers, often referred to as polyketones or polyketone polymers, have been shown to be of a structure of the repeating formula

where A is the moiety of the ethylenically unsaturated hydrocarbon polymerized through the ethylenic unsaturation. For example, when the ethylenically unsaturated hydrocarbon is ethylene, the polymer is represented by the repeating formula

The general process for the production of such polymers is illustrated by a number of published European Patent application Nos. including 0,121,965 and 0,181,014. The process generally involves a catalyst composition formed from a compound of the Group VIII metals palladium, cobalt or nickel, the anion of a non-hydrohalogenic acid having a pKa below 2 and a bidentate ligand of phosphorus, arsenic or antimony.

The resulting polymers are relatively high molecular weight thermoplastics having utility in the production of shaped articles such as containers for food and drink and shaped parts for the automotive industry. For some particular applications it has been found desirable to have properties of a polymeric composition which are somewhat different from those of the polyketone polymer. It would be of advantage to retain the desirable properties of the polyketone and yet improve other properties. These advantages are often obtained through the provision of a polymer blend.

SUMMARY OF THE INVENTION

This invention contemplates the provision of a blend of a linear alternating polymer of carbon monoxide and at least one ethylenically unsaturated hydrocarbon with an unsaturated hydrocarbon-unsaturated acid polymer. More particularly, there is provided according to the invention a blend of a linear alternating polymer of carbon monoxide and at least one ethylenically unsaturated hydrocarbon with a propylene-unsaturated carboxylic acid copolymer or a propylene-ethylene-unsaturated carboxylic acid terpolymer.

DESCRIPTION OF THE INVENTION

The polyketone polymers which are employed in the blends of the invention are linear alternating polymers of carbon monoxide and at least one ethylenically unsaturated hydrocarbon. Suitable ethylenically unsaturated hydrocarbons for use as precursors of the polyketones have from 2 to 20 carbon atoms inclusive, preferably up to 10 carbon atoms, and are aliphatic such as ethylene and other α-olefins including propylene, 1-butene, 1-octane and 1-docecene, or are arylaliphatic containing an aryl substituent on an otherwise aliphatic molecule, preferably an aryl substituent on a carbon atom of the ethylenic unsaturation. Illustrative of this later class of ethylenically unsaturated hydrocarbons are styrene, p-methylstyrene, p-ethylstyrene and m-methylstyrene. Preferred polyketones are copolymers of carbon monoxide and ethylene or terpolymers of carbon monoxide, ethylene and a second hydrocarbon of at least three carbon atoms, particularly an α-olefin such as propylene.

The structure of the polyketone polymers is that of a linear alternating polymer of carbon monoxide and ethylenically unsaturated hydrocarbon and the polymer will contain substantially one molecule of carbon monoxide for each molecule of hydrocarbon. When terpolymers of carbon monoxide, ethylene and a second ethylenically unsaturated hydrocarbon are employed in the blends of the invention there will be at least two units incorporating a moiety of ethylene for each unit employing a moiety of the second hydrocarbon. Preferably, there will be from about 10 to about 100 units employing a moiety of ethylene per unit incorporating a moiety of the second hydrocarbon. The polymer chain is therefore illustrated by the formula

where G is the moiety obtained by polymerization of the second hydrocarbon through the ethylenic unsaturation. The

units and the

units are found randomly throughout the polymer chain and the ratio of y:x is no more than about 0.5. In the modification of the invention where copolymers of carbon monoxide and ethylene are employed, the second hydrocarbon is not present in the polyketone polymer chain and the polymers are represented by the above formula wherein y=0. When y is other than 0, as in the case of terpolymers, ratios of y:x from about 0.1 to about 0.01 are preferred. The end groups or "caps" of the polymer chain will depend upon what materials are present during the production of the polymer and whether and how the polymer has been purified. The precise nature of the end groups is of little significance with regard to the overall properties of the polymer so that the polyketone polymer is fairly represented by the above formula. Of particular interest are the polymers of molecular weight from about 1,000 to about 200,000, particularly those of molecular weight from about 10,000 to about 50,000 containing substantially equimolar quantities of carbon monoxide and unsaturated hydrocarbon. The physical properties of such polymers depend in part on the molecular weight of the polymer, whether the polymer is a copolymer or a terpolymer and the relative proportion of any second hydrocarbon present in the case of terpolymers. Typical melting points of such polymers are from about 175° C. to about 300° C., more frequently from about 210° C. to about 270° C.

A method of producing polyketone polymers which is now becoming conventional is to contact the carbon monoxide and hydrocarbon(s) with a catalyst composition formed from a palladium compound, a non-hydrohalogenic acid having a pKa below about 6 and a bidentate ligand of defined structure. The scope of the process for the production of the polyketone polymers is substantial. Without wishing to be limited, a preferred palladium compound is a palladium carboxylate, particularly palladium acetate, the preferred anion is the anion of trifluoroacetic acid or p-toluenesulfonic acid and the preferred bidentate phosphorus ligand is selected from 1,3-bis(diphenylphosphino)propane or 1,3-bis[di(2-methoxyphenyl)phosphino]propane.

Polymerization is conducted under polymerization conditions in the gaseous phase or in a liquid phase in the presence of a reaction diluent such as a lower alkanol, e.g., methanol or ethanol. The reactants and catalyst are contacted by conventional means as by shaking or stirring. Suitable reaction temperatures are from about 20° C. to about 150° C. with preferred temperatures being from about 50° C. to about 135° C. Typical reaction pressures are from about 1 bar to about 200 bar, more typically from about 10 bar to about 100 bar. Subsequent to reaction the polymer product is recovered as by filtration or decantation. The polyketone polymer may contain residues of the catalyst which are removed, if desired, by treatment of the polymer with a solvent which is selective for the residues.

The unsaturated hydrocarbon-unsaturated acid polymers which are blended with the polyketone according to the invention are copolymers of propylene and $\alpha,\beta$-ethylenically unsaturated carboxylic acids and terpolymers of propylene, ethylene and $\alpha,\beta$-ethylenically unsaturated carboxylic acids. Although a variety of $\alpha,\beta$-ethylenically unsaturated carboxylic acids of up to 10 carbon atoms, or in some cases more, are useful as a component of the copolymers and terpolymers, e.g., 2-hexanoic acid, 2-octenoic acid and 2-decenoic acid, the preferred unsaturated acids are those of up to 4 carbon atoms which are acrylic acid, methacrylic acid and crotonic acid. Acrylic acid is a particularly preferred component of the unsaturated hydrocarbon-unsaturated acid polymers.

The unsaturated hydrocarbon-unsaturated acid polymers suitable for use in the invention are those copolymers and terpolymers having a relatively large proportion of propylene or propylene-ethylene and a relatively small proportion of the unsaturated acid. Typical copolymers and terpolymers are from about 0.1% by weight to about 35% by weight based on total polymer of the $\alpha,\beta$-ethylenically unsaturated carboxylic acid. The polymers preferably have from about 1% by weight to about 20% by weight based on total polymer of the unsaturated acid.

The propylene-ethylene-unsaturated acid terpolymers used in the invention are those terpolymers incorporating a relatively greater proportion of propylene than ethylene. The ratio of propylene to ethylene in the propylene-ethylene-unsaturated acid terpolymers is typically from about 10:1 to about 2:1, preferably from about 5:1 to about 2:1 and most preferably from about 4:1 to about 3:1.

The method by which the unsaturated acid copolymers and terpolymers are produced is not material and propylene-unsaturated acid copolymers and ethylene-propylene-unsaturated acid terpolymers produced by a variety of methods are useful in the blends of the invention. A number of propylene-acrylic acid copolymers and propylene-ethylene-acrylic acid terpolymers are commercially available.

The blends of the invention are predominantly polyketone with a lesser quantity of either the propylene-unsaturated acid copolymer or the propylene-ethylene-unsaturated acid terpolymer. The precise percentage of the unsaturated acid polymer to be employed is not critical and percentages from about 0.01% by weight to about 35% by weight, based on the total blend, are satisfactory. Better results are obtained through the use of from about 0.01% by weight to about 3% by weight, more preferred 0.1% by weight to about 1% by weight, of the unsaturated acid polymer, based on total blend.

The method of producing the blend of polyketone and unsaturated acid polymer is not material so long as an intimate blend of the two components is produced without undue degradation of the blend or its components. A particularly useful procedure is to intimately mix the polymers in the form of granules and/or powder in a high shear mixer. "Intimately mixing" means to mix the polymers with sufficient mechanical shear and thermal energy to ensure that the components will not delaminate on processing. Intimate mixing is typically achieved by employing high shear extrusion compounding machines such as twin screw compounding extruders and thermoplastic extruders.

The blends of the invention may also include conventional additives such as antioxidants and stabilizers, fillers and fire retardant materials, mold release agents and other materials designed to improve the properties of the resulting blend. Such additives are added by conventional methods prior to, together with or subsequent to the blending of the polyketone and the unsaturated acid polymer.

The polyketone polymer blends with propylene-unsaturated acid copolymer or with propylene-ethylene-unsaturated acid terpolymer are non-miscible blends wherein the unsaturated acid polymer exists as a discrete phase in the polyketone matrix. The blends of the invention have properties which are different from those of the blend components alone. Under melt processing conditions, the blends generally show increases in melt viscosity with time, as does polyketone alone, most likely due to crosslinking of the polymer compositions. However, in comparison to polyketone polymer, the blends of the invention exhibit a lower rate of increase in melt viscosity with time under constant shear, in particular, the blends having below about 5% by weight unsaturated acid polymer. The blends have an improved melt stability over polyketone polymer and are of particular utility in instances where molded parts are exposed to conditions of elevated temperature.

The blends of the invention can be processed by means of the usual techniques, such as injection molding, compression molding or extrusion molding, into, among other things sheets, plates and molded objects. Illustrative of such applications are the production of internal as well as external parts for automotive applications and structural parts for application in the construction industry.

The invention is further illustrated by the following Illustrative Embodiments which should not be construed as limiting the invention.

ILLUSTRATIVE EMBODIMENT I

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the terpolymer was 220° C. and the polymer had a limiting viscosity number (LVN) of 1.96 (measured at 60° C. in m-cresol).

Illustrative Embodiment II

Measurements of melting points and crystallization temperatures, or alternatively heats of melting and heats of fusion, for blends of the terpolymer of Illustrative Embodiment I and an unsaturated acid polymer were made by the use of a Perkin-Elmer differential scanning calorimeter (DSC) which employs samples of polymer or polymer composition in sealed pan containers. The pan and contents are heated at a controlled rate, typically 20° C./minute, until the sample has melted. The pan and contents are then cooled until the sample has solidified and then heated, past a second melting point, to 285° C. at which temperature the sample is maintained for 10 minutes. The pan and contents are then cooled until the sample has solidified a second time. The melting and crystallization temperatures are defined as the temperatures at which the heat flow reaches a maximum (for melting) or a minimum (for crystallization). Typically the melting point, Tm, will be higher than the crystallization temperature, Tc. Although a number of factors influence the melting point and crystallization temperature, these values are also influenced by the crystallinity of the polymer. In general, the smaller the difference between the first and second melting points, the greater the degree of retained crystallinity. The same relationship is generally true for the crystallization temperatures. The higher the degree of retained crystallinity the better the melt stability of the composition.

It is also possible to determine through the use of the DSC the magnitude of the first and second heats of melting ($H_1$ and $H_2$) and the first and second heats of crystallization ($C_1$ and $C_2$) for the polymer blend. In general, the heats of crystallization for the blend will be higher than the corresponding values for the neat terpolymer. The greater the difference is, the greater the degree of crystallinity which has been retained in the blend.

Blends of the terpolymer of Illustrative Embodiment I and 0.1%, 1% and 5% by weight based on total blend of a propylene-acrylic acid copolymer were dry blended and extruded in a 15 mm twin screw Baker Perkins extruder. The propylene-acrylic acid copolymer, marketed by Scientific Polymer Products, Inc., contained 6% by weight acrylic acid. The blend containing 5% by weight propylene-acrylic acid did not extrude well apparently due to excessive crosslinking of the composition under the particular extruder conditions. It is expected that the 5% by weight blend would extrude well under alternative extrusion conditions.

Samples of the 0.1% and 1% by weight blends were evaluated in the DSC. A sample of the terpolymer prepared in Illustrative Embodiment I was evaluated in the DSC as a standard. The results of the DSC measurements are given in Table 1 which shows the improved melt stability of the blend compositions in comparision to the standard. In Table 1, temperatures are measured in °C. and heats are measured in cal/g.

TABLE 1

| Sample | $Tm_1$ | $Tc_1$ | $Tm_2$ | $Tc_2$ | $C_1$ | $C_2$ | $H_1$ | $H_2$ |
|---|---|---|---|---|---|---|---|---|
| Standard | 223 | 172 | 216 | 158 | 16.1 | 13.9 | 18.0 | 18.7 |
| 0.1% w Blend | 226 | 176 | 218 | 167 | 17.6 | 14.9 | 18.6 | 19.3 |
| 1% w Blend | 231 | 171 | 218 | 164 | 16.7 | 15.2 | 19.0 | 18.7 |

Blends of the terpolymer of Illustrative Embodiment I and 0.1%, 1% and 5% by weight based on total blend of a propylene-ethylene-acrylic acid terpolymer were dry blended and extruded in a 15 mm twin screw Baker Perkins extruder. The propylene-ethylene-acylic acid terpolymer, marketed by Scientific Polymer Products, Inc. was 19% by weight ethylene based on total polymer and 6% by weight acrylic acid. The blend containing 5% by weight unsaturated acid terpolymer did not extrude well apparently due to excessive crosslinking of the composition under the particular extruder conditions. It is expected that the 5% by weight blend would extrude well under alternative extrusion conditions.

Samples of the 0.1% and 1% by weight blends were evaluated in the DSC. The results of the measurements are given in Table 2 which shows the improved melt stability of the blends in comparison to the standard. In Table 2, temperatures are measured in °C. and heats are measured in cal/g.

TABLE 2

| Sample | $Tm_1$ | $Tc_1$ | $Tm_2$ | $Tc_2$ | $C_1$ | $C_2$ | $H_1$ | $H_2$ |
|---|---|---|---|---|---|---|---|---|
| Standard | 223 | 172 | 216 | 158 | 16.1 | 13.9 | 18.0 | 18.7 |
| 0.1% w Blend | 227 | 169 | 223 | 158 | 17.1 | 14.8 | 18.3 | 17.8 |
| 1% w Blend | 225 | 172 | 220 | 165 | 17.1 | 15.1 | 19.4 | 17.8 |

ILLUSTRATIVE EMBODIMENT III

When a linear alternating polymer of carbon monoxide and ethylene is blended with 0.1% by weight based on total blend of an acrylic acid copolymer, improved melt stability, as compared with the unblended polymer, will be observed.

What is claimed is:

1. A composition comprising a non-miscible blend of (a) a linear alternating polymer of carbon monoxide and at least one ethylenically unsaturated hydrocarbon of from 2 to 20 carbon atoms inclusive and (b) a propylene-$\alpha,\beta$-ethylenically unsaturated carboxylic acid copolymer, said $\alpha,\beta$-ethylenically unsaturated carboxylic acid having up to 10 carbon atoms, wherein the acid is present in the copolymer in a quantity of about 0.1% to about 35% by weight based on the total copolymer and wherein the amount of said propylene-$\alpha,\beta$-ethylenically unsaturated carboxylic acid in said blend is 0.01% to 35% by weight based on the total blend.

2. The composition of claim 1 wherein the linear alternating polymer is represented by the formula

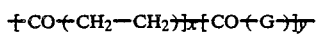

wherein G is the moiety of an ethylenically unsaturated hydrocarbon of at least three carbon atoms and the ratio of y:x is no more than 0.5.

3. The composition of claim 2 wherein the $\alpha,\beta$-unsaturated carboxylic acid has up to 4 carbon atoms and the copolymer is present in a quantity of about 0.01% to about 3% by weight based on the total blend.

4. The composition of claim 3 wherein G is the moiety of propylene.

5. The composition of claim 4 wherein the $\alpha,\beta$-unsaturated carboxylic acid is acrylic acid.

6. The composition of claim 3 wherein y is 0.

7. The composition of claim 6 wherein the $\alpha,\beta$-unsaturated carboxylic acid is acrylic acid.

8. A composition comprising a non-miscible blend of (a) a linear alternating polymer of carbon monoxide and at least one ethylenically unsaturated hydrocarbon of from 2 to 20 carbon atoms inclusive and (b) an propylene-ethylene-$\alpha,\beta$-ethylenically unsaturated carboxylic acid terpolymer, said $\alpha,\beta$-ethylenically unsaturated carboxylic acid having up to 10 carbon atoms, wherein the acid is present in the terpolymer in a quantity of about 0.1% to about 35% by weight based on the total terpolymer and wherein the amount of said propylene-ethylene-$\alpha,\beta$-ethylenically unsaturated carboxylic acid terpolymer in said blend is 0.01% to 35% by weight based on the total blend.

9. The composition of claim 8 wherein the linear alternating polymer is represented by the formula

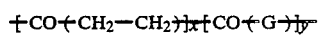

wherein G is the moiety of an ethylenically unsaturated hydrocarbon of at least three carbon atoms and the ratio of y:x is no more than 0.5.

10. The composition of claim 9 wherein the $\alpha,\beta$-unsaturated carboxylic acid has up to 4 carbon atoms and the terpolymer is present in a quantity of about 0.01% to about 3% by weight based on the total blend.

11. The composition of claim 10 wherein G is the moiety of propylene.

12. The composition of claim 11 wherein the $\alpha,\beta$-unsaturated carboxylic acid is acrylic acid.

13. The composition of claim 10 wherein y is 0.

14. The composition of claim 13 wherein the $\alpha,\beta$-unsaturated carboxylic acid is acrylic acid.

* * * * *